March 28, 1950      P. S. MOYER      2,501,687

VEGETABLE SHREDDER

Filed March 28, 1946

INVENTOR:
PRESCOTT S. MOYER.
BY
Hyde, Meyer, Baldwin & Doran
ATTORNEYS

Patented Mar. 28, 1950

2,501,687

UNITED STATES PATENT OFFICE 2,501,687

VEGETABLE SHREDDER

Prescott S. Moyer, Lakewood, Ohio

Application March 28, 1946, Serial No. 657,661

5 Claims. (Cl. 146—116)

This invention relates to improvements in a vegetable shredder and more particularly to one adapted for shredding carrots.

An object of the present invention is to provide a simple device whereby a portion of a vegetable may be easily held centered in the device, after which appropriate cutting edges will cut long, thin shreds of the vegetable as the latter is pressed toward the cutting edges.

Other objects and advantages of the invention will be apparent from the accompanying drawings and description, and the essential features thereof will be set forth in the appended claims.

In the drawing,

Fig. 2 is an end elevational view of the cutting head of Fig. 1;

Figs. 3 and 4 are disassembled portions of the cutting head with Fig. 4 showing a modified arrangement of the central cutting teeth; while

Figure 1:
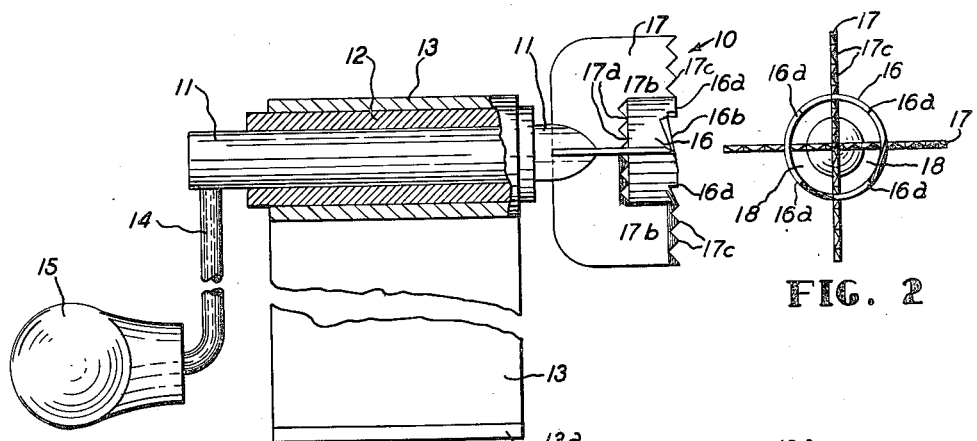
Fig. 1 is a side elevational view of one form of my device with a portion broken away to more clearly show the construction.

My improved shredding device comprises a cutting head 10 fixed in the end of a shaft 11 which is mounted for rotation in any suitable manner. In Fig. 1 I have shown a bearing sleeve 12 mounted in a bracket 13, the other end of which may be provided with a tongue 13a for insertion in a wall bracket or the like, but the specific mounting means forms no part of the present invention. Any suitable means may be provided for rotating the shaft 11, in the present instance this comprises a crank arm 14 provided with a handle 15. Obviously, motor means might be provided, if desired.

I will describe my device as utilized in connection with a vegetable the shape of a carrot, although other uses of my device are possible.

Figure 3:
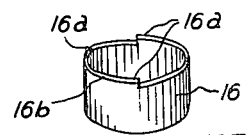

As shown in Figs. 1, 2 and 3, means is provided for centering the carrot as it is presented endwise in axial alinement with the rotatable head 10. The centering means shown comprises a ring 16 concentric with shaft 11 and having outwardly directed cutting teeth 16a. Four of these are shown in Figs. 1, 2 and 3, although more or less may be provided. It will be clearly noted in Fig. 1, that the outer edge of ring 16 slopes circumferentially downward as indicated at 16b from one of the teeth 16a to the base of the next tooth. This permits ready release of material shredded by the teeth 16a.

As the carrot is fed endwise by hand, or otherwise, toward the shaft 11 the teeth 16a trim the vegetable substantially to the internal diameter of ring 16. The central portion of the vegetable next comes in contact with the teeth 17a which are formed on one or both of a pair of crossed plates 17 which mutually cross each other on the axis of shaft 11. Preferably, crossing slots are formed at right angles to each other diametrically of the end of shaft 11 and the plates 17 enter into these slots. The parts can be secured together either by a forced fit or by brazing, soldering, or welding. It will be noted in Fig. 1, that the plates 17 are generally of U form providing legs 17b spaced apart just sufficiently to receive the ring 16 between them. The teeth 17a are formed along the bottom member of the U and between the legs 17b. These teeth extend toward the oncoming vegetable and present serrated edges in Figs. 1 and 2 so as to cut relatively narrow strips from the vegetable. These shreds fall away through the openings 18 indicated on Fig. 2.

Figure 4:
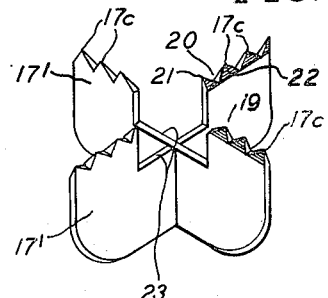

The portion of the vegetable outside the ring 16 is shredded by the serrated teeth 17c on the outer ends of the arms 17b. These teeth engage any portion of the vegetable outside of ring 16 to cut it into fine shreds. Referring to Fig. 4 where the teeth 17c are exactly like those in the head shown in Figs. 1 and 2, it will be noted that the teeth on one of the plates 17' lie intermediate the teeth of the other plate insofar as the circumferential path of the teeth is concerned. Specifically, the tooth 19 will travel in a path following the notch 20 so that material missed by the teeth 21 and 22 will be cut by the tooth 19.

The ring 16 may be held in the plates 17 by any suitable means, for instance, it may be a forced fit between the arms 17b or may be welded, soldered, or brazed to these arms or slight grooves parallel to the central axis of ring 16 may be cut in the outer walls of the ring so that it slides endwise between the arms 17b. In the form of cutting head shown in Figs. 3 and 4, the parts are all exactly similar to those already described, and are assembled together in a similar manner, except that the edges 23 of the plates 17' have had the teeth 17a omitted. This cuts the end of the vegetable in wider shreds than in the case of the first described form, but will do a fairly satisfactory job.

Obviously, for carrots or other vegetables not much greater in diameter than the ring 16 the teeth 17c might be omitted, thus permitting any sort of cutting edge on the outer ends of arms 17b to slice away whatever vegetable material extended outside of the ring 16.

Figure 5:
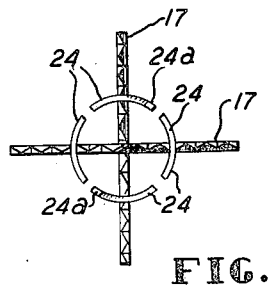
Figs. 5 and 6 show a further modification of the cutting head.
Figure 6:
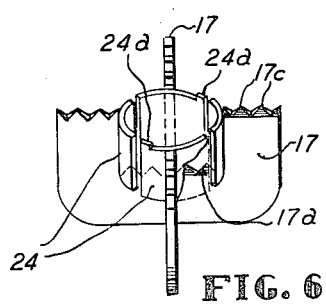

In the form of device shown in Figs. 5 and 6, the plates 17 are exactly like those already described and provided with teeth 17a and 17c. Here, however, the central ring 16 has been replaced by arcuate portions 24 integrally formed with the plates 17 and providing a number of surfaces for centering the vegetable on the axis of the shaft 11. In other words, discontinuous arcuate portions 24 will provide the centering action just as well as the continuous ring 16. Here, the two cutting teeth 24a perform the function described in connection with the teeth 16a of the previously described form.

The operation of my device should be readily understood from the above description. The carrot or other vegetable, similar in size and shape, is held by one hand in position to enter the ring 16a axially while the shaft 11 is rotated by the other hand of the operator applied to the handle 15. As the carrot is fed in, the teeth 16a and 17c cut away the outside portion in long, thin shreds, while the teeth 17a cut away the central portion in a similar manner. All of these shreds are readily cleared from the cutting head and may drop into a receiving dish beneath the same. If the teeth are modified in the ways which I have indicated, it merely causes a difference in the width of the shreds cut.

What I claim is:

1. A vegetable shredder comprising a shredding head rotatable about an axis, said head having a plurality of plates extending in planes in which said axis lies, said plates having a first set of teeth lying generally in a plane at right angles to said axis near the outer end of said head, said plates having a second set of teeth lying generally in a plane at right angles to said axis and radially and axially inwardly from said first named set of teeth, said teeth extending generally parallel to said axis, means for rotating said head to cause said teeth to scrape away the vegetable as it is fed in by hand while being held against rotation, and a ring carried by said plates concentric with said axis and between said sets of teeth for centering a vegetable in said head.

2. The combination of claim 1 including teeth on the edge of said ring first engaging a vegetable and adapted to cut circumferentially thereof for cutting a vegetable to substantially cylindrical form as it is fed into said head.

3. A vegetable shredder comprising a shredding head rotatable about an axis, said head having scraping teeth in a plane at right angles to said axis, means for rotating said head to cause said teeth to scrape away the vegetable as it is fed in by hand while being held against rotation, a hollow ring on said head concentric with said axis and radially inwardly from said teeth for centering a vegetable in said head, and means for cutting that portion of the vegetable fed through said hollow ring.

4. A vegetable shredder comprising a cutting head rotatable about an axis, two sets of cutting teeth located in spaced planes at right angles to said axis, one set of teeth at the outer end of said head and the other set inwardly therefrom, each set of teeth extending radially of said head, a hollow ring on said head near said outer set of teeth and concentric with said axis for centering a vegetable engaging said head, and means for rotating said head as a vegetable is fed against said teeth.

5. A vegetable shredder comprising a unitary head rotatable about an axis, said head comprising an open cylindrical ring having its axis located upon the axis of rotation, teeth extending radially of said cylinder and inwardly of the cylinder circumference at the rear end of said ring, other teeth extending radially with reference to said cylinder at the front end thereof and extending radially outwardly therefrom, and all of said teeth extending toward the front end of said cylindrical ring.

PRESCOTT S. MOYER.

REFERENCES CITED

The following references are of record in the file of this patent:

UNITED STATES PATENTS

| Number | Name | Date |
|---|---|---|
| 673,662 | Schwechler | May 7, 1901 |
| 921,917 | Troxell | May 18, 1909 |
| 1,485,681 | Lake | Mar. 4, 1924 |
| 2,190,105 | Mock | Feb. 13, 1940 |
| 2,238,971 | Carroll | Apr. 22, 1941 |
| 2,297,158 | McDonald | Sept. 29, 1942 |
| 2,316,953 | Hammond | Apr. 20, 1943 |

FOREIGN PATENTS

| Number | Country | Date |
|---|---|---|
| 2,156,421 | Austria | May 21, 1939 |
| 259,759 | Italy | Aug. 3, 1928 |
| 79,053 | Switzerland | Oct. 1, 1918 |